United States Patent
Amarilio et al.

(10) Patent No.: US 11,704,086 B2
(45) Date of Patent: Jul. 18, 2023

(54) FAST ACTIVATION DURING WAKE UP IN AN AUDIO SYSTEM

(71) Applicant: QUALCOMM Incorporated, San Diego, CA (US)

(72) Inventors: Lior Amarilio, Yokneam (IL); Sharon Graif, Zichron Yaakov (IL); Jason Gonzalez, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 263 days.

(21) Appl. No.: 16/894,096

(22) Filed: Jun. 5, 2020

(65) Prior Publication Data
US 2021/0382677 A1    Dec. 9, 2021

(51) Int. Cl.
| G06F 3/16 | (2006.01) |
| G06F 13/40 | (2006.01) |
| G06F 13/42 | (2006.01) |
| G06F 13/362 | (2006.01) |

(52) U.S. Cl.
CPC .......... *G06F 3/162* (2013.01); *G06F 13/3625* (2013.01); *G06F 13/4072* (2013.01); *G06F 13/4282* (2013.01)

(58) Field of Classification Search
CPC .. G06F 3/162; G06F 13/3625; G06F 13/4072; G06F 13/4282
See application file for complete search history.

(56) References Cited

U.S. PATENT DOCUMENTS

| 2006/0168466 | A1* | 7/2006 | Choate | G06F 13/4282 |
| | | | | 713/600 |
| 2010/0049881 | A1* | 2/2010 | Manor | G06F 1/3215 |
| | | | | 710/18 |
| 2014/0289465 | A1* | 9/2014 | Sudou | G06F 3/0611 |
| | | | | 711/115 |
| 2015/0063337 | A1 | 3/2015 | Kang et al. | |
| 2015/0242353 | A1* | 8/2015 | Kawai | G06F 13/385 |
| | | | | 710/33 |
| 2017/0063700 | A1* | 3/2017 | Wang | H04L 7/033 |
| 2019/0121767 | A1* | 4/2019 | Amarilio | G06F 3/162 |
| 2020/0192827 | A1* | 6/2020 | Zhang | G06F 13/382 |
| 2020/0195470 | A1* | 6/2020 | Yano | H04L 12/427 |

OTHER PUBLICATIONS

Cirrus Logic, "CS42L42: Low-Power Audio Codec with SoundWire™—I2S/TDM and Audio Processing", Aug. 2017 (Year: 2017).*

* cited by examiner

*Primary Examiner* — Phong H Dang
(74) *Attorney, Agent, or Firm* — Qualcomm Incorporated (57) ABSTRACT

Systems and methods for fast activation of slaves during wake up in an audio system allow a master device in an audio system such as a SOUNDWIRE audio system to send system and/or topology information to capable slave devices during a wake up window so that the slaves may start in an active mode rather than a safe mode. In the most recent proposed versions of SOUNDWIRE, there is a check PHY_Num phase. The systems for fast activation of slaves cause a negative differential line to be driven with an encoded signal by the master during a check PHY_Num phase where the encoded signal indicates a fast mode speed. Capable slaves may then begin in a fast mode rather than a safe (and slow) mode. Latency may be reduced by starting in a fast mode, which may improve the user's audio experience.

20 Claims, 11 Drawing Sheets

FAST ACTIVATION DURING WAKE UP IN AN AUDIO SYSTEM

BACKGROUND

I. Field of the Disclosure

The technology of the disclosure relates generally to audio systems, more particularly to SOUNDWIRE audio systems, and still more particularly to the wake-up protocol of the SOUNDWIRE protocol.

II. Background

Mobile communication devices have become increasingly common in current society. The prevalence of these mobile communication devices is driven in part by the many functions that are now enabled on such devices. Increased processing capabilities in such devices mean that mobile communication devices have evolved from pure communication tools into sophisticated mobile entertainment centers, thus enabling enhanced user experiences. The mobile communication devices commonly include at least one microphone and multiple speakers. The microphone and the speakers used in the mobile communication devices typically have analog interfaces which require a dedicated two-wire connection between each pair of devices. Since a mobile communication device is capable of supporting multiple audio devices, it may be desired to allow a microprocessor or other control device in the mobile communication device to communicate audio data to multiple audio devices over a common communication bus simultaneously.

In this regard, the MIPI® Alliance initially developed the Serial Low-power Inter-chip Media Bus (SLIMbus$^{SM}$ or SLIMBUS) to handle audio signals within a mobile communication device. The first release was published in October 2005 with v1.01 released on Dec. 3, 2008. In response to industry feedback, MIPI has also developed Sound-Wires$^{SM}$ (SOUNDWIRE), a communication protocol for a processor in the mobile communication device (the "master") to control distribution of digital audio streams between one or more audio devices (the "slave(s)") via one or more SOUNDWIRE slave data ports. Version 1 was released Jan. 21, 2015. Version 1.2 was released April 2019 and the standard continues to evolve, necessitating further innovation associated therewith. Version 1.4 is currently under discussion by members of MIPI.

SUMMARY OF THE DISCLOSURE

Aspects disclosed in the detailed description include systems and methods for fast activation of slaves during wake up in an audio system. In particular, exemplary aspects of the present disclosure allow a master device in an audio system such as a SOUNDWIRE audio system to send system and/or topology information to capable slave devices during a wake-up window so that the slaves may start in an active mode rather than a safe mode. In the most recent proposed versions of SOUNDWIRE, including SOUNDWIRE-I3S, there is a check PHY_Num phase. Exemplary aspects of the present disclosure cause a negative differential line to be driven with an encoded signal by the master during the check PHY_Num phase where the encoded signal indicates a fast mode speed. Capable slaves may then begin in a fast mode rather than a safe (and slow) mode. Latency may be reduced by starting in a fast mode, which may improve the user's audio experience.

In this regard in one aspect, an integrated circuit (IC) is disclosed. The IC includes a master audio device. The master audio device includes an audio bus interface coupled to a differential audio bus. The master audio device also includes a control circuit. The control circuit is configured to wake the differential audio bus from a standby state. The control circuit is also configured to, during activation of the differential audio bus, signal a communication rate to a capable slave on one line of the differential audio bus. The control circuit is also configured to start communication with the capable slave at the communication rate without passing through a safe mode.

In another aspect, an IC is disclosed. The IC includes a slave audio device. The slave audio device includes an audio bus interface coupled to a differential audio bus. The slave audio device also includes a control circuit. The control circuit is configured to, during activation of the differential audio bus, receive a signal indicating a communication rate on one line of the differential audio bus. The control circuit is also configured to start communication with a master audio device at the communication rate without passing through a safe mode.

In another aspect, a method for controlling a differential audio bus is disclosed. The method includes exiting a standby state. The method also includes sending an encoded signal on one line of the differential audio bus from a master audio device to a slave audio device indicating a communication rate. The method also includes starting communication at the communication rate without passing through a safe mode.

In another aspect, a method of operating a differential audio bus is disclosed. The method includes, during activation of the differential audio bus, receiving, at a slave audio device, a signal indicating a communication rate on one line of the differential audio bus. The method also includes starting communication with a master audio device at the communication rate without passing through a safe mode.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for fast activation of slaves during wake up in an audio system. In particular, exemplary aspects of the present disclosure allow a master device in an audio system such as a SOUNDWIRE audio system to send system and/or topology information to capable slave devices during a wake-up window so that the slaves may start in an active mode rather than a safe mode. In the most recent proposed versions of SOUNDWIRE, including SOUND-WIRE-I3S (sometimes referred to as SWI3S), there is a check PHY_Num phase. Exemplary aspects of the present disclosure cause a negative differential line to be driven with an encoded signal by the master during the check PHY_Num phase where the encoded signal indicates a fast mode speed. Capable slaves may then begin in a fast mode rather than a safe (and slow) mode. Latency may be reduced by starting in a fast mode, which may improve the user's audio experience.

The present disclosure is well suited for use in a next generation SOUNDWIRE audio system such as that set forth in the draft specification for SOUNDWIRE-I3S v0.4r08 dated Jan. 23, 2020, or v0.4r09, copies of which are available to MIPI members. Such an audio system relies on a differential audio bus having at least two conductors (DP (data positive), DN (data negative)) for each lane. There may be up to eight lanes (i.e., up to sixteen conductors) in such a bus. Before addressing particular aspects of the present disclosure beginning with reference to FIG. 3A below, an overview of various audio system topologies as well as block diagrams for masters and slaves are presented in FIGS. 1A-1F. An overview of a conventional activation signaling process is provided with reference to FIGS. 2A and 2B.

Figure 1A:
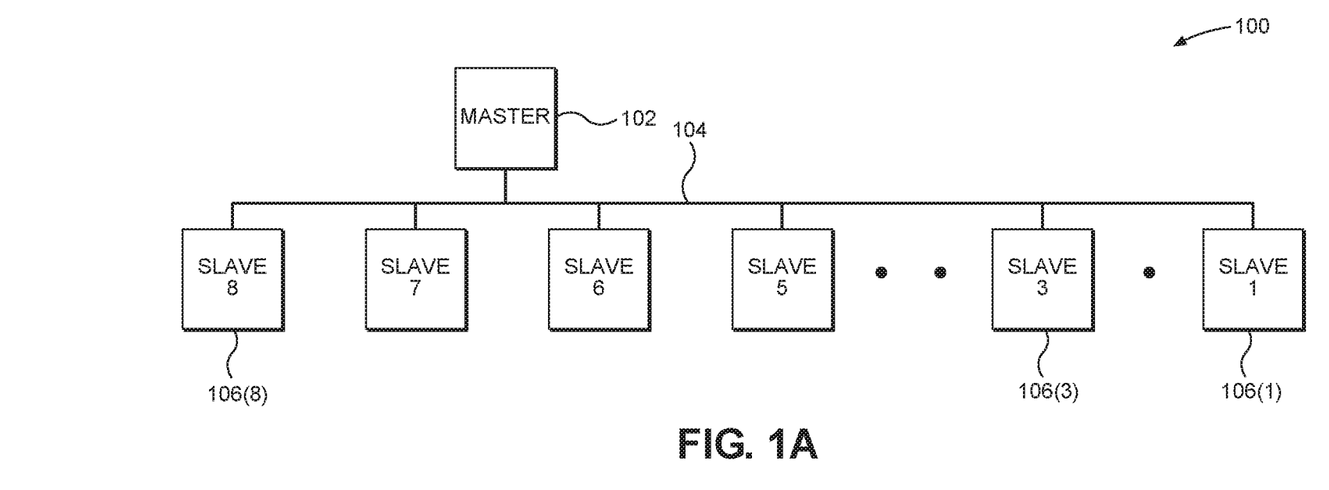
FIGS. 1A-1D are block diagrams of exemplary topologies of audio systems for an audio bus having slaves coupled to a master through the audio bus.

In this regard, FIG. 1A illustrates a first audio system 100 having a master 102 coupled to an audio bus 104 that extends along a broadly linear signal path on a physical medium, with the master 102 and slaves 106(1)-106(8) coupled anywhere along that signal path. This topology is sometimes referred to as a "multi-drop" topology. As the master 102 is coupled to an audio bus, the master 102 may be referred to as a master audio device. Similarly, slaves 106 may be referred to as slave audio devices.

Figure 1B:
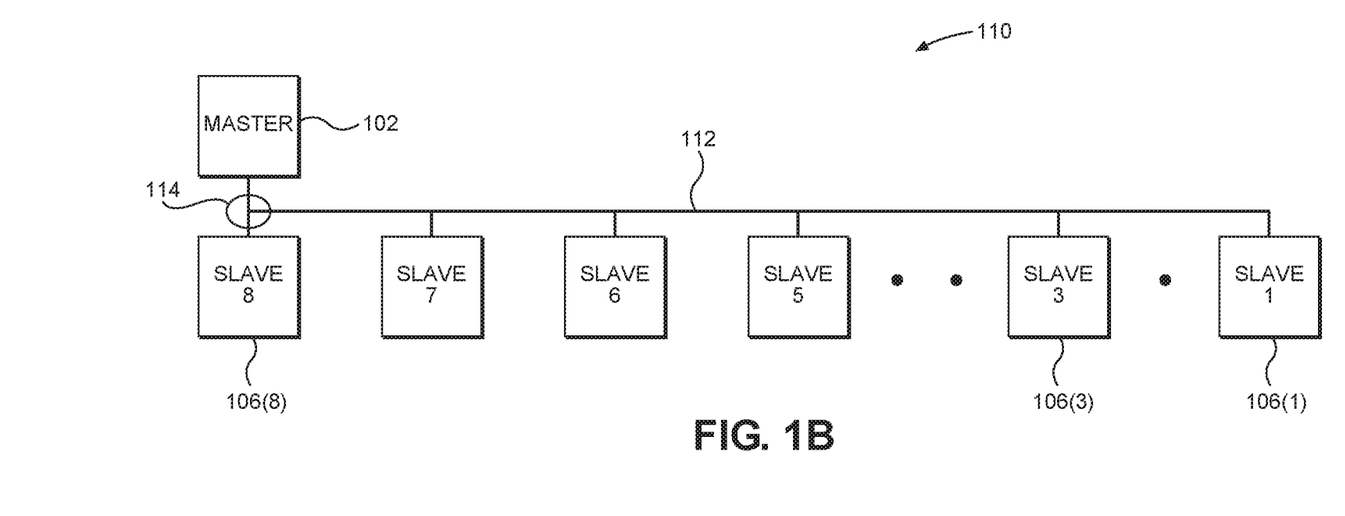

FIG. 1B illustrates a second audio system 110 having a master 102 coupled to an audio bus 112 that extends along a broadly linear signal path on the physical medium. The master 102 is coupled to a first end 114 of the audio bus 112, but there is no constraint on the position of the slaves 106(1)-106(8). This topology is sometimes referred to as a "master-at-end" topology.

Figure 1C:
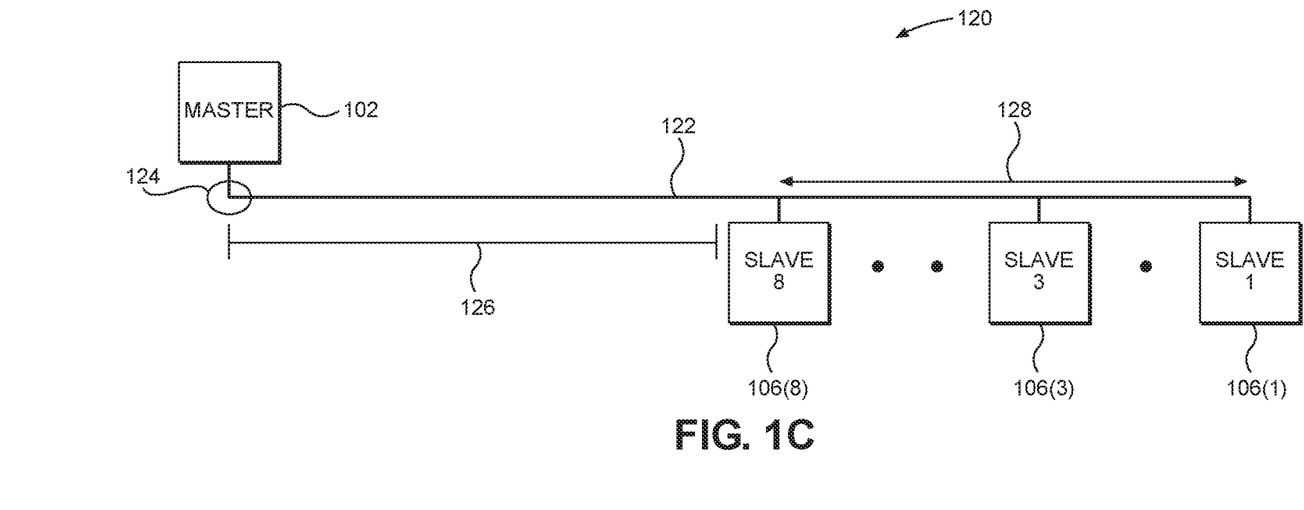

FIG. 1C illustrates a third audio system 120 similar to the second audio system 110 in that a master 102 is coupled to an audio bus 122 at a first end 124, but the slaves 106(1)-106(8) are coupled to the audio bus 122 at a distance 126 remote from the first end 124, where the distance 126 is relatively large compared to a distance 128 between a first slave 106(1) and a last slave 106(8). This topology is sometimes referred to as a "star-on-a-stick" topology.

Figure 1D:
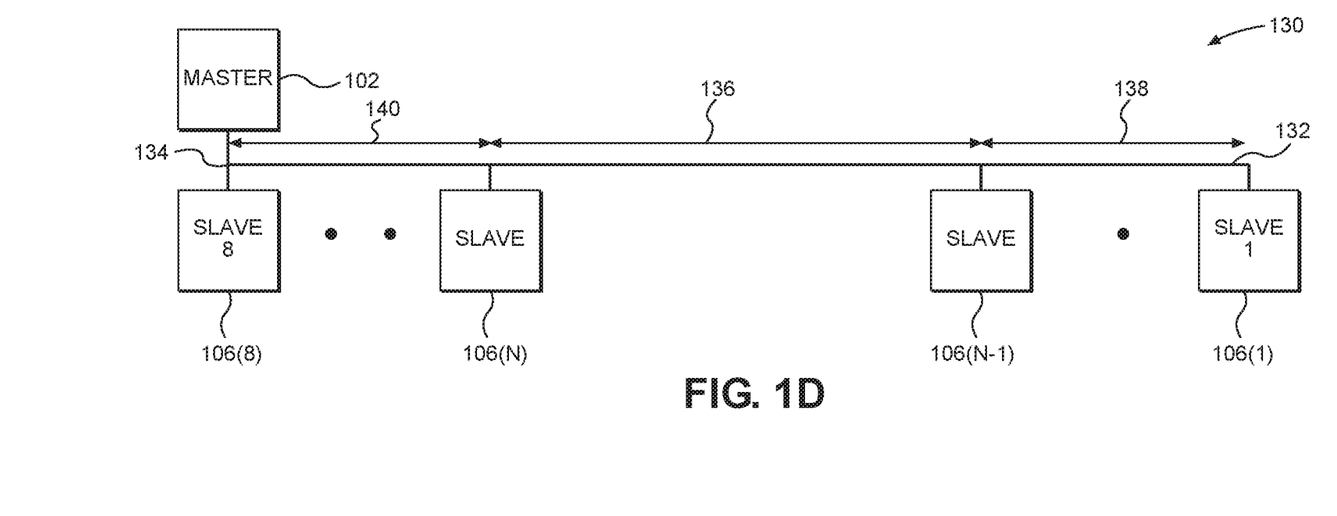

FIG. 1D illustrates a fourth audio system 130 that has a master 102 coupled to an audio bus 132 at a first end 134. Some number of slaves 106(N)-106(8) are coupled to the audio bus 132 proximate the first end 134 while a second number of slaves 106(1)-106(N−1) are coupled to the audio bus 132 at a distance 136 from the slaves 106(N)-106(8), which is relatively large compared to a distance 138 between slaves 106(1) and 106(N−1) or a distance 140 between slaves 106(N) and 106(8). This topology is sometimes referred to as "dumbbell" topology.

The audio buses 104, 112, 122, and 132 may be differential audio buses and there may be more or fewer than eight slaves attached to the audio buses 104, 112, 122, and 132. While these topologies are presented, it should be appreciated that they are exemplary and not intended to limit the disclosure. Other topologies may also use aspects of the present disclosure.

Figure 1E:
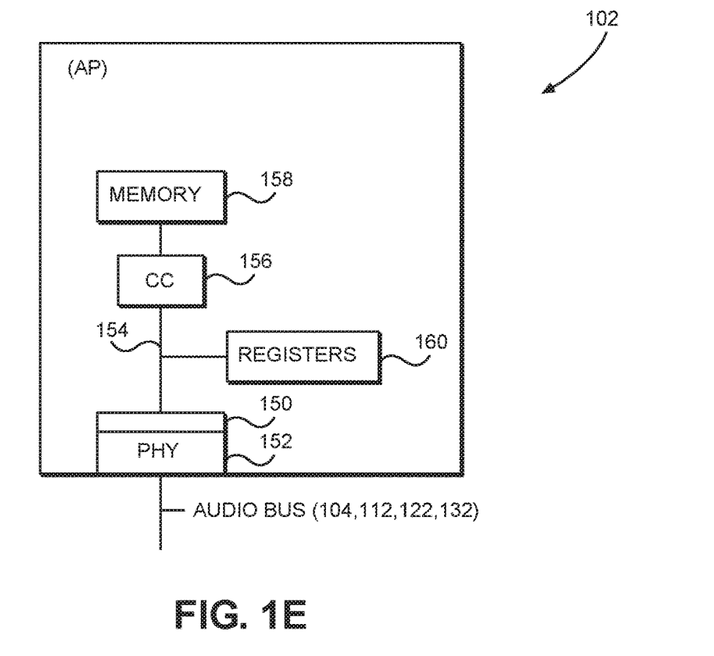
FIG. 1E is a block diagram of a master device from one of the topologies of FIGS. 1A-1D.

The master 102 is better illustrated in FIG. 1E, where a block diagram of the master 102 is provided. The master 102 may be an application processor (AP, shown), a codec (not shown), a mobile device modem (MDM, not shown), a digital signal processor (DSP), or the like. The master 102 may further include a bus interface 150 that may be or work with a physical layer (PHY) 152 that is configured to couple to one of the audio buses 104, 112, 122, or 132. As the bus interface 150 may interoperate with an audio bus, the bus interface 150 may be referred to as an audio bus interface. The master 102 may include an internal bus 154 that couples a master control circuit 156 to the PHY 152 as well as a memory 158 and/or registers 160.

Figure 1F:
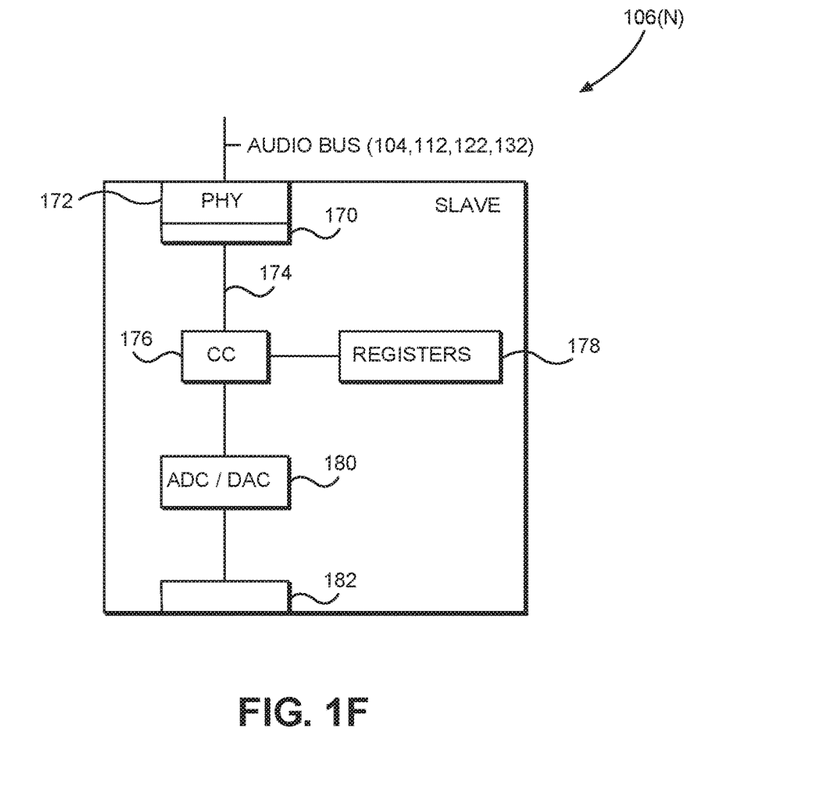
FIG. 1F is a block diagram of a slave device from one of the topologies of FIGS. 1A-1D.

A slave 106(N) is better illustrated in FIG. 1F. The slave 106(N) may be a microphone, a speaker, a codec, a DSP, or the like. The slave 106(N) may include a bus interface 170 that may be or work with a PHY 172 that is configured to couple to one of the audio buses 104, 112, 122, or 132. The slave 106(N) may include an internal bus 174 that couples a slave control circuit 176 to the PHY 172 as well as registers 178. Further, the slave 106(N) may include a digital-to-analog converter (DAC) or analog-to-digital converter (ADC) 180, which may couple to an input or output element 182.

In the absence of the present disclosure, the proposed SOUNDWIRE-I3S standard provides an activation sequence that initially wakes the bus, checks the PHY_Num of the slaves, and likely transitions to low voltage differential signaling (LVDS) in a safe, relatively slow mode. While it is likely that the bus transitions to LVDS, it is possible that the bus transitions to a single-ended, single-wire, non-low-voltage differential signaling. Regardless of the particulars, during the safe, slow mode, information may be exchanged to allow a transition to an active, fast mode. This sequence may be seen in FIG. 2A, where the state of a bus 200 is provided on a top line 202 with a data positive (DP) line 204 and a data negative (DN) line 206 provided as noted. In particular, the bus 200 begins in a standby state 208 with both the DP line 204 and the DN line 206 at logical lows (210A and 210B, respectively). The bus 200 is woken at state 212 by raising the DP line 204 to a logical high 214A while the DN line 206 stays at a logical low 214B. In normal operation, the bus 200 enters a check PHY_Num state 216, where there is an initial logical low 218A on the DP line 204 with a logical high 218B on the DN line 206 to signal the transition to the check PHY_Num state 216, followed by a logical high 220A on the DP line 204 and a logical low 220B on the DN line 206. This check PHY_Num state 216 may be maintained for a relatively long time before a transition to LVDS state 222 signaled by the DP line 204 transitioning to a logical low 224. There is an initial row structure state and active state 226 during which the DP line 204 and the DN line 206 operate in a slow safe mode 228. This initial row structure typically runs for a minimum of several hundreds of rows and can take several milliseconds of time so that all the slaves are able to synchronize to that row and accept initial configuration information. Subsequently, there may be a transition to an active fast state 230 where the DP line 204 and the DN line 206 operate at a higher frequency 232.

Figure 2A:
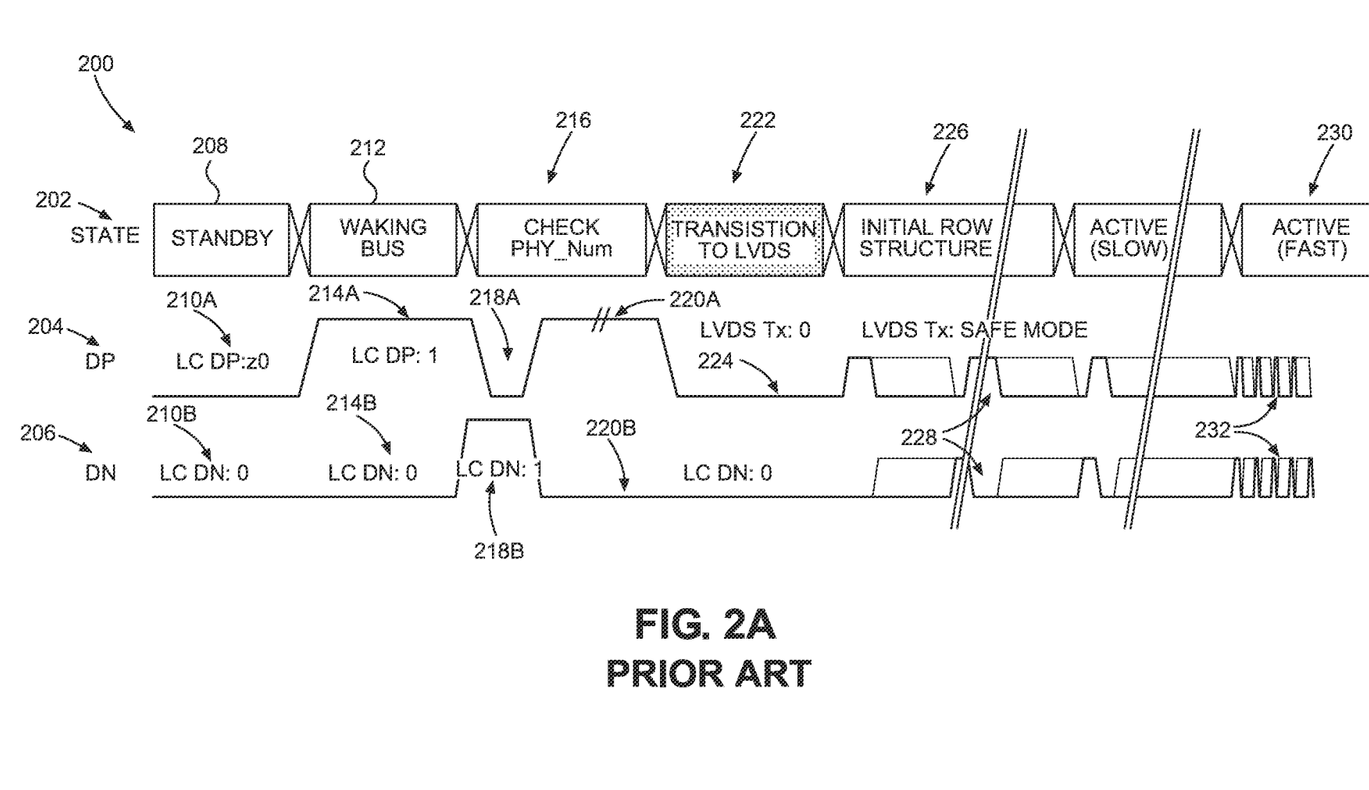
FIG. 2A is a signal diagram showing how SOUNDWIRE currently activates slaves on an audio bus.
Figure 2B:
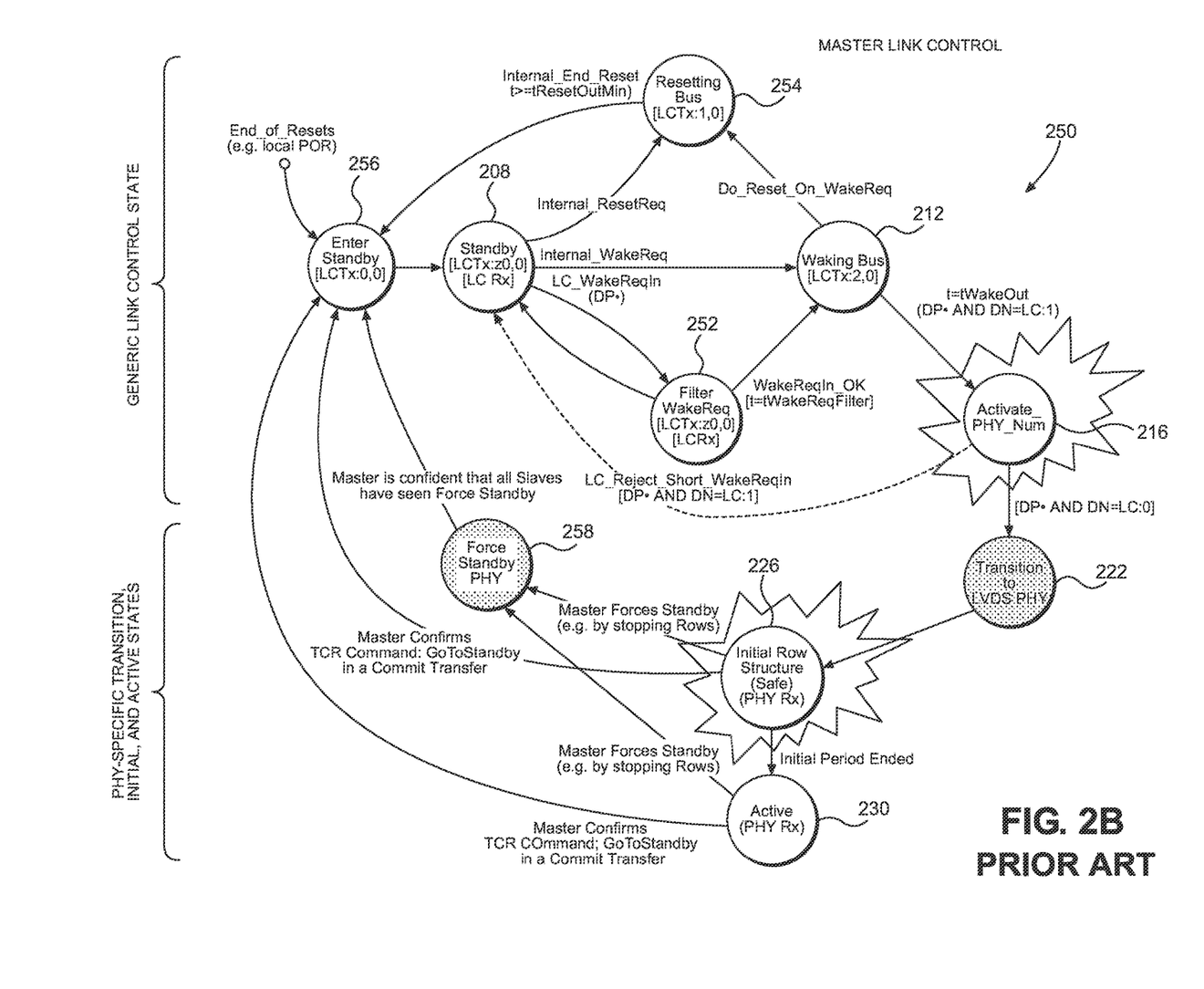
FIG. 2B is a state diagram corresponding to the signal diagram of FIG. 2A.

The state of the bus may be better illustrated in state diagram 250 set forth in FIG. 2B. The states already discussed in FIG. 2A are provided using the same numbers. In particular, assuming the bus 200 starts at the standby state 208, it may enter a wake request state 252, which returns to standby state 208 before activating the waking bus state 212, or the bus 200 may go from the wake request state 252 to the waking bus state 212. Alternatively, the bus 200 may enter a reset state 254, where it proceeds to an enter standby state 256, which returns to the standby state 208. It should be appreciated that the reset state 254 may also be invoked during the waking bus state 212. However, normally, after the waking bus state 212, the bus 200 will enter the activate or check PHY_Num state 216, which may take a long time where no data is transmitted on the bus 200. From the check PHY_Num state 216, the bus will transition to an LVDS state 222 (or other slow, safe state), and then the initial row structure state and active state 226 before reaching the active fast state 230, entering a force standby state 258 or otherwise returning to the enter standby state 256.

Exemplary aspects of the present disclosure use the time during the check PHY_Num state 216 to send additional data to the slaves 106(1)-106(N) from the master 102 on the DN line 206 with instructions to capable slaves 106 to signal a communication rate to the slaves 106 to start in the active fast state 230. Starting the active fast state 230 sooner reduces latency and may improve a listener's audio experience.

Figure 3A:
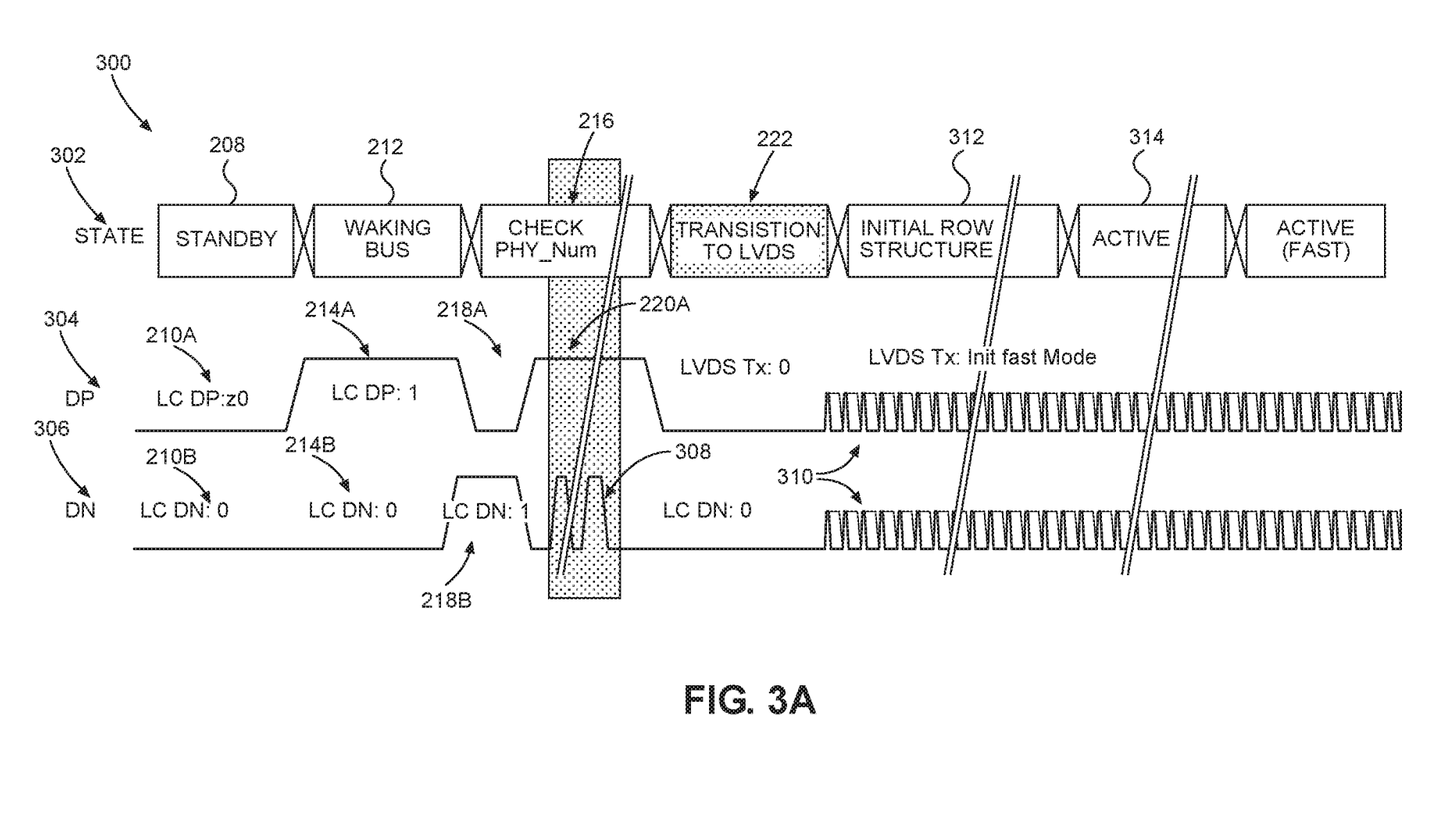
FIG. 3A is a signal diagram of a signaling activity that allows fast activation of slaves according to an exemplary aspect of the present disclosure.

In this regard, FIG. 3A illustrates signaling during the check PHY_Num state 216. In many regards, the state is essentially the same on bus 300 (which may be an audio bus) where the state of the bus 300 is provided on a top line 302 with a DP line 304 and a DN line 306 provided as noted. In particular, the bus 300 begins in the standby state 208 with both the DP line 304 and the DN line 306 at logical lows (210A and 210B, respectively). The bus 300 is woken at state 212 by raising the DP line 304 to a logical high 214A while the DN line 306 stays at a logical low 214B. As with the normal operation, the bus 300 enters a check PHY_Num state 216, where there is an initial logical low 218A on the DP line 304 with a logical high 218B on the DN line 306 to signal the transition to the check PHY_Num state 216, followed by a logical high 220A on the DP line 304.

Figure 3B:
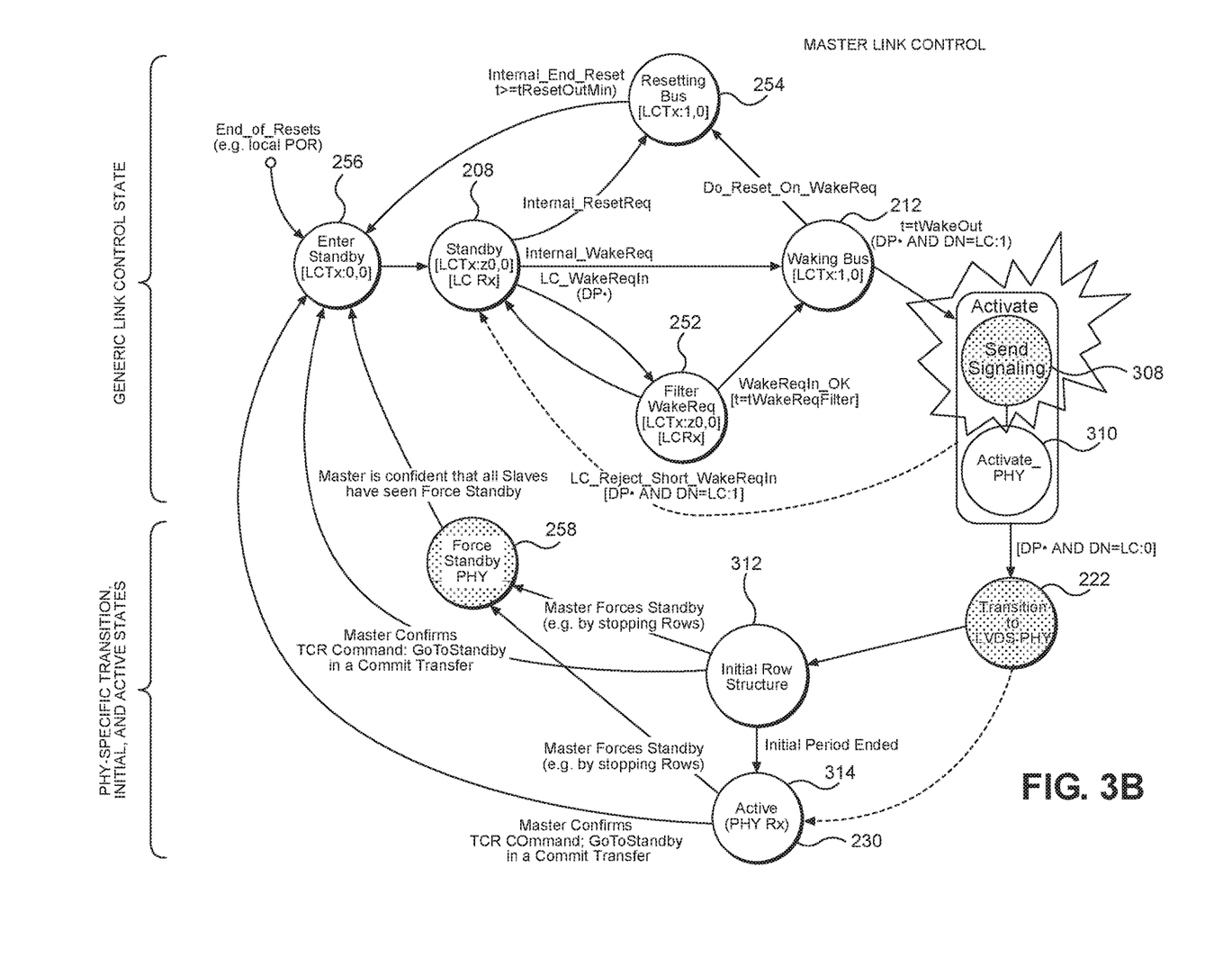
FIG. 3B is a state diagram corresponding to the signal diagram of FIG. 3A.

In contrast to the conventional approach, the master 102 uses this state to signal an encoded message 308 on the DN line 306. The encoded message signals a communication rate to the enabled slaves 106(1)-106(N). Enabled slaves 106(1)-106(N) receive the encoded message 308 and know to activate in a fast mode or specific communication rate rather than the safe slow initial row structure and active state 226. That is, the bus 300 transitions to the LVDS state 222, but at the end of the LVDS state 222, the DP line 304 and the DN line 306 activate in a fast mode 310 during the initial row structure state 312 and the active state 314. The modification to the state diagram of FIG. 2B is set forth in FIG. 3B, where the fast mode 310 is present after signaling the encoded message 308.

Figure 4:
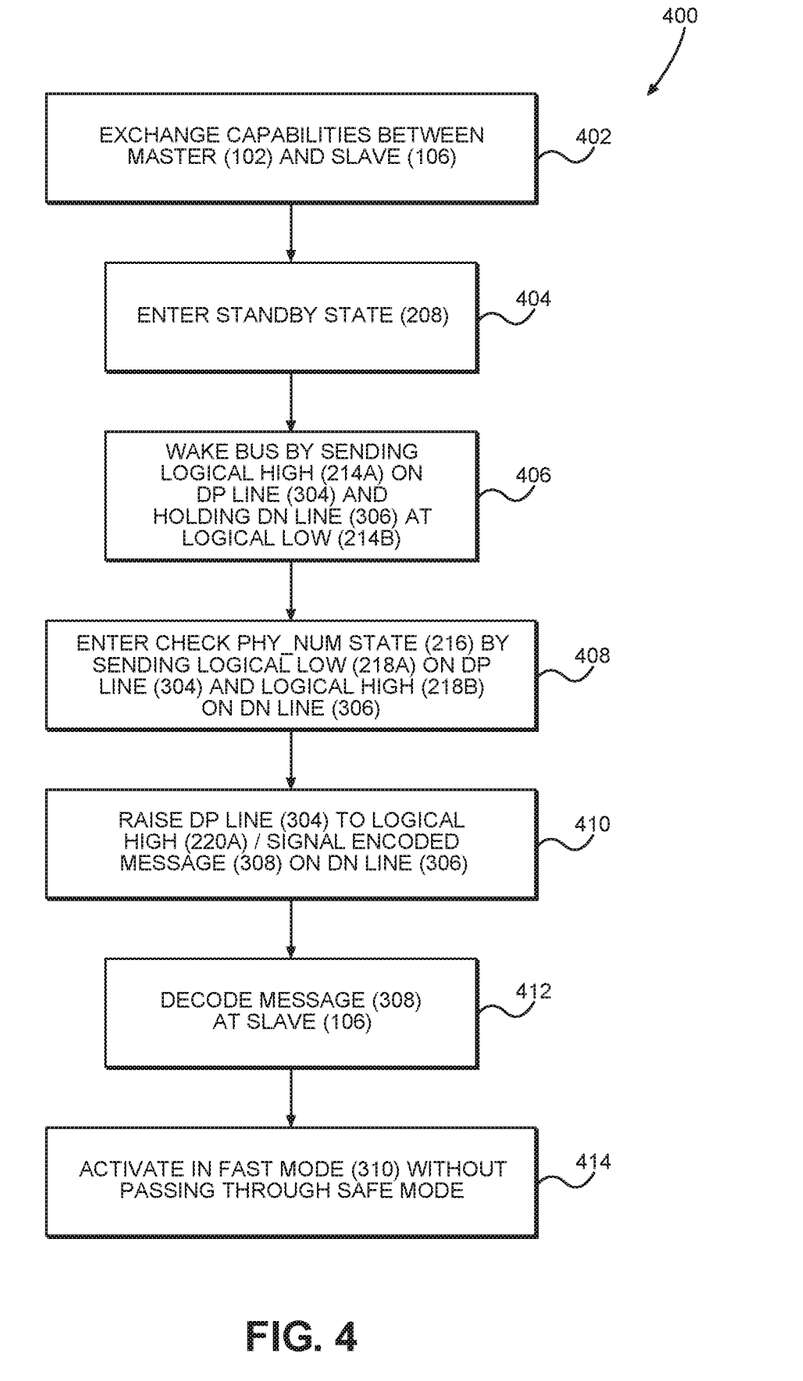
FIG. 4 is a flowchart illustrating an exemplary process for fast activation of slaves according to an exemplary aspect of the present disclosure.

A process 400 associated with the in-band signaling during activation to achieve fast signaling is illustrated in FIG. 4. In particular, the process 400 begins with an exchange of capabilities between the master 102 and a slave 106 (block 402). Specifically, the master 102 is informed that the slave 106 is capable of fast activation. This information exchange may be done at manufacturing or during initialization of the audio bus such as by reading it out of the registers 178. Further, this information may be stored in the registers 160 by the master 102.

With continued reference to FIG. 4, the process 400 continues when the audio bus enters a standby state 208 (block 404). At some subsequent time, the master 102 may wake the audio bus by sending a logical high 214A on the DP line 304 and holding the DN line 306 at a logical low 214B (block 406). This step is conventional and part of the proposed SOUNDWIRE standard. The audio bus then enters a check PHY_Num state 216 by sending a logical low 218A on the DP line 304 and a logical high 218B on the DN line 306 (block 408). The beginning of this step is also conventional, however, exemplary aspects of the present disclosure modify the proposed standard by now raising the DP line 304 to a logical high 220A and signaling an encoded message 308 on the DN line 306 (block 410). The encoded message 308 may be a series of pulses where the encoding is based on the number of pulses, the width of the pulses, the spacing between the pulses, or some combination of these variations. Likewise, different codes may indicate different speeds at which the slaves 106 may start instead of activating in a slow safe mode. By way of example, a typical safe speed will run at 0.6-0.768 Megarows per second (Mrow/sec) and enable one bit of control per row. As noted, when used, the safe speed will run for hundreds of rows (and thus several milliseconds) before a slave can establish communication and a subsequent transition to a fast mode. In contrast, a typical active or fast mode will run at 3-6 Mrow/sec, with up to 32 bits per row.

The slave 106 may decode the message 308 (block 412) and then activate in a fast mode 310 without passing through a safe mode (block 414).

Thus, exemplary aspects of the present disclosure provide a way to deliver a short configuration stream during initial communication before a direct transition to an active or fast mode. This configuration stream allows the slave to skip the long phase of row synchronization. It is expected that the number of bits to be sent during this mode is small and can be a few tens of bits, which mean that the transition to the fast mode can take place within a few tens to hundreds of microseconds.

The systems and methods for fast activation during wake up in an audio system according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 5A:
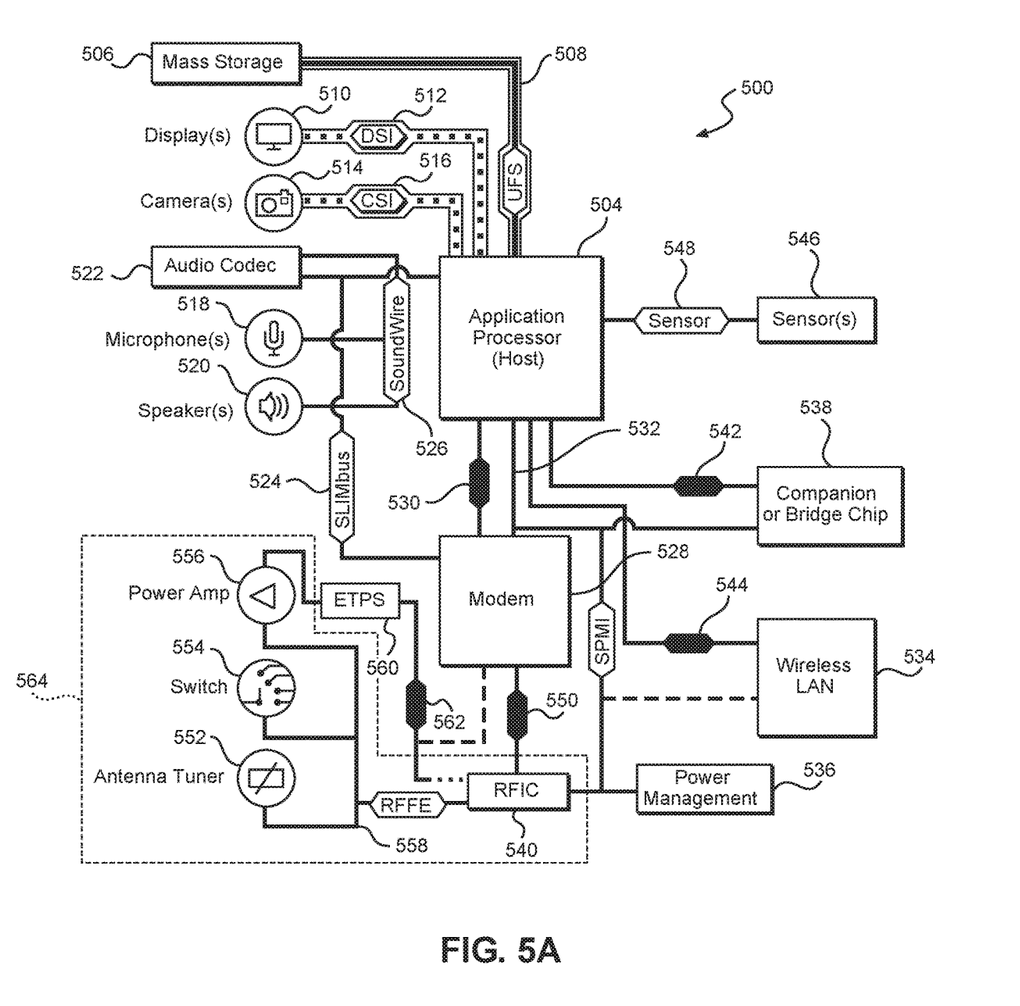
FIGS. 5A-5C are block diagrams of exemplary processor-based systems that can include the audio systems of FIGS. 1A-1D.
Figure 5B:
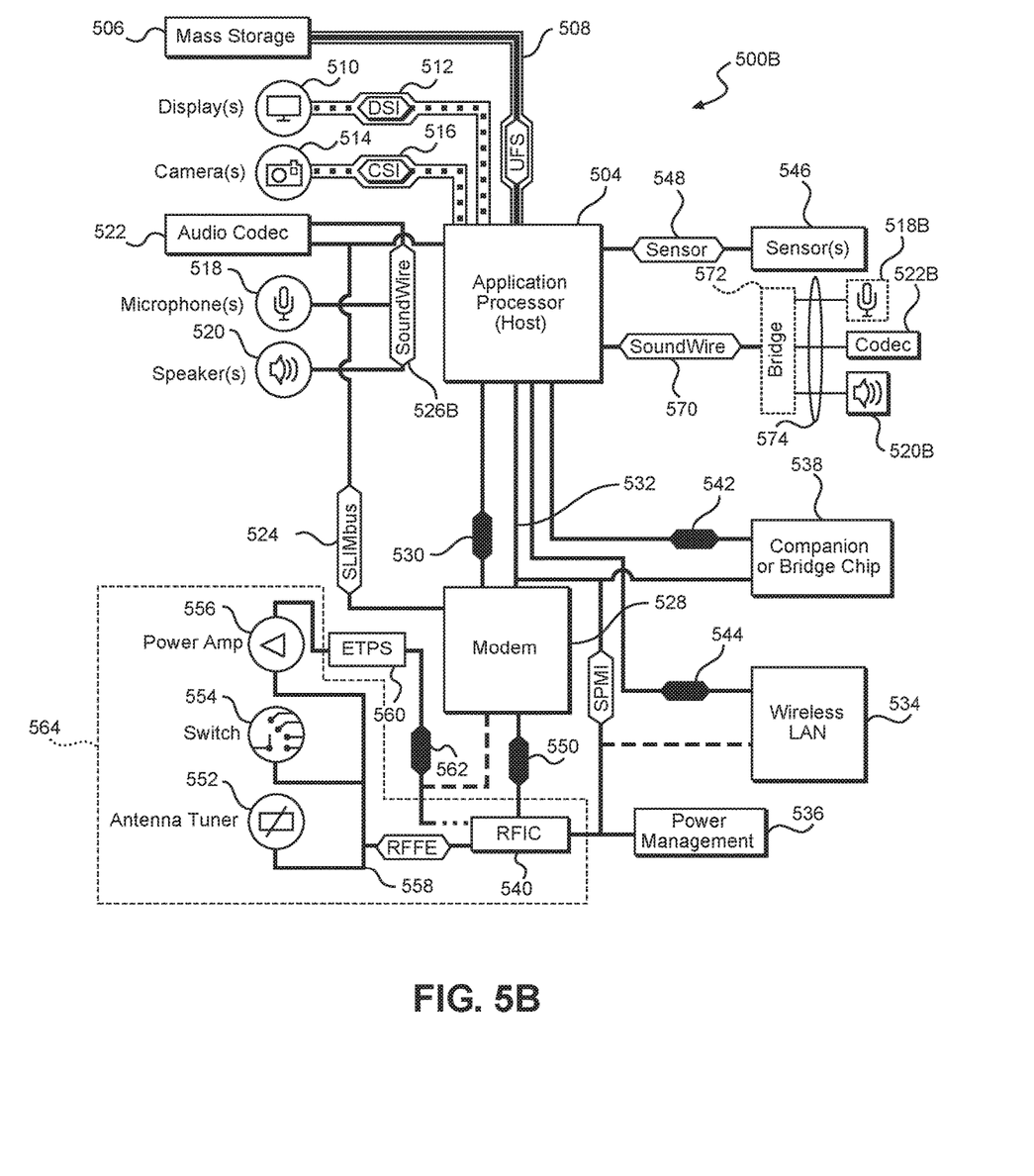
Figure 5C:
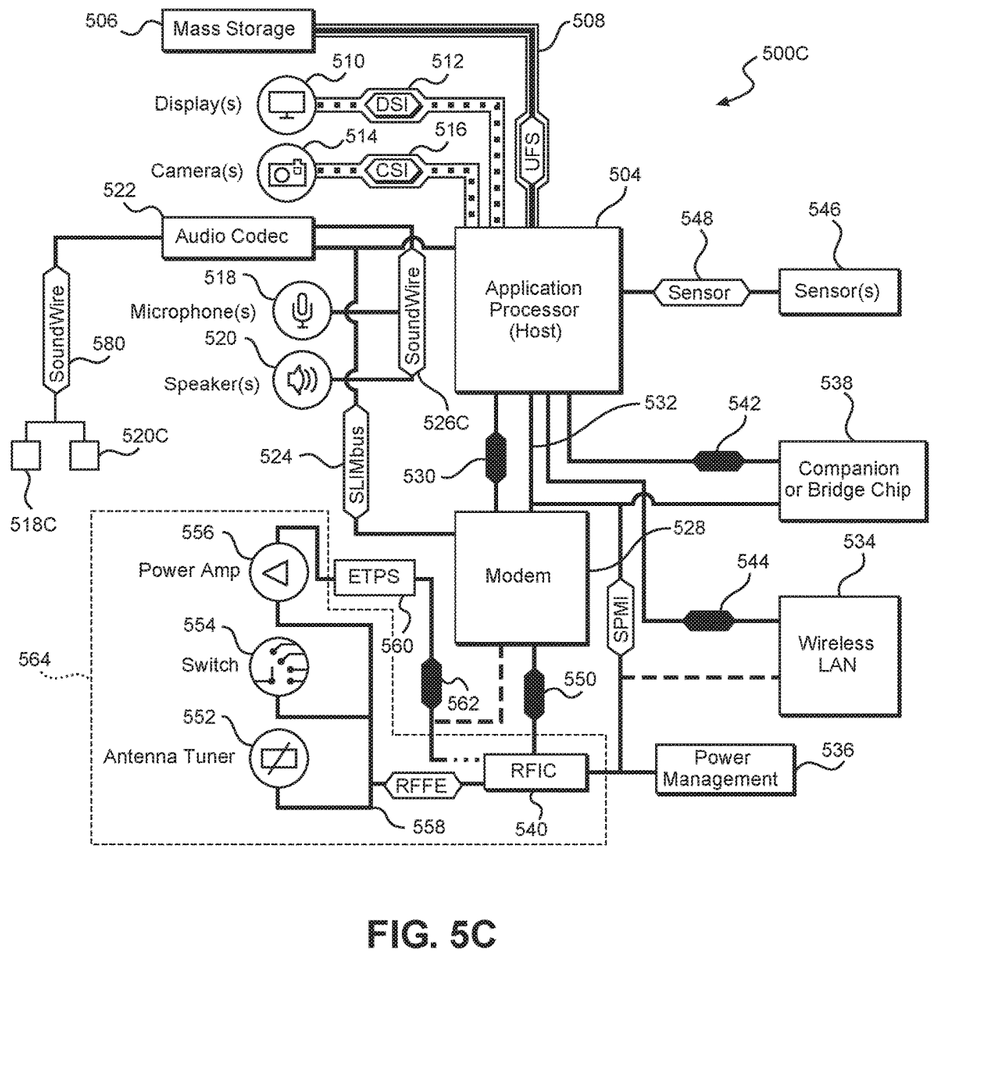

Exemplary aspects of the present disclosure are well suited for use with a SOUNDWIRE bus, although other differential audio buses may also benefit from concepts disclosed herein. As used herein, reference to SOUNDWIRE means reference to SOUNDWIRE-I3S version v0.4r09 and its finalized version. There are a variety of locations in a computing device at which a SOUNDWIRE bus may be placed. In this regard, FIGS. 5A-5C illustrate various placements. In most instances, the overall architecture is the same. In this regard, FIG. 5A is system-level block diagram of an exemplary mobile terminal 500 such as a smart phone, mobile computing device tablet, or the like. While a mobile terminal is particularly contemplated as being capable of benefiting from exemplary aspects of the present disclosure, it should be appreciated that the present disclosure is not so limited and may be useful in any system having a differential bus without satisfactory wake-up processes. For the sake of illustration, it is assumed that a SOUNDWIRE bus 526, which may be the audio bus 104, 112, 122, 132, within the mobile terminal 500 is among multiple communication buses configured to use the in-band reset and wake-up processes on a differential audio bus according to the present disclosure.

With continued reference to FIG. 5A, the mobile terminal 500 includes an application processor 504 (sometimes referred to as a host) that communicates with a mass storage element 506 through a universal flash storage (UFS) bus 508. The application processor 504 may further be connected to a display 510 through a display serial interface (DSI) bus 512 and a camera 514 through a camera serial interface (CSI) bus 516. Various audio elements such as a microphone 518, a speaker 520, and an audio codec 522 may be coupled to the application processor 504 through a serial low-power inter-chip multimedia bus (SLIMbus) 524. Additionally, the audio elements may communicate with each other and the audio codec 522 through the SOUNDWIRE bus 526. A modem 528 may also be coupled to the SLIMbus 524. The modem 528 may further be connected to the application processor 504 through a peripheral component interconnect (PCI) or PCI express (PCIe) bus 530 and/or a system power management interface (SPMI) bus 532. Note that the SLIMbus 524 may be replaced by a SOUNDWIRE bus in some implementations.

With continued reference to FIG. 5A, the SPMI bus 532 may also be coupled to a wireless local area network (WLAN) integrated circuit (IC) (WLAN IC) 534, a power management integrated circuit (PMIC) 536, a companion integrated circuit (sometimes referred to as a bridge chip) 538, and a radio frequency integrated circuit (RFIC) 540. It should be appreciated that separate PCI buses 542 and 544 may also couple the application processor 504 to the companion integrated circuit 538 and the WLAN IC 534. The application processor 504 may further be connected to sensors 546 through a sensor bus 548. The modem 528 and the RFIC 540 may communicate using a bus 550.

With continued reference to FIG. 5A, the RFIC 540 may couple to one or more radio frequency front end (RFFE) elements, such as an antenna tuner 552, a switch 554, and a power amplifier 556 through an RFFE bus 558. Additionally, the RFIC 540 may couple to an envelope tracking power supply (ETPS) 560 through a bus 562, and the ETPS 560 may communicate with the power amplifier 556. Collectively, the RFFE elements, including the RFIC 540, may be considered an RFFE system 564.

FIG. 5B illustrates an alternate placement of the SOUNDWIRE NEXT bus. While the majority of the elements are the same as the mobile terminal 500, the mobile terminal 500B illustrated in FIG. 5B has a SOUNDWIRE bus 526B coupling the audio codec 522 to the microphone(s) 518 and the speaker(s) 520. The application processor 504 may be coupled to a SOUNDWIRE NEXT bus 570 that may couple to an optional bridge 572. If the bridge 572 is present, then the bus 574 may be a SOUNDWIRE bus. If the bridge 572 is not present, then the SOUNDWIRE NEXT bus 570 may couple directly to microphones 518B, speakers 520B, and/or an audio codec 522B.

Similarly, FIG. 5C illustrates another alternate placement of the SOUNDWIRE NEXT bus. In the mobile terminal 500C, the audio codec 522 may couple to a SOUNDWIRE bus 526C and a SOUNDWIRE NEXT bus 580. The SOUNDWIRE NEXT bus 580 may couple to microphones 518C and speakers 520C.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. An integrated circuit (IC) comprising:
a master audio device comprising:
an audio bus interface coupled to a differential audio bus; and
a control circuit configured to:
wake the differential audio bus from a standby state where a data positive (DP) line and a data negative (DN) line of the differential audio bus are both at logical lows by sending a logical high on the DP line;
during activation of the differential audio bus, hold the DP line of the differential audio bus at the logical high while using the DN line of the differential audio bus to signal a communication rate to a capable slave; and
start communication with the capable slave at the communication rate without passing through a safe mode.

2. The IC of claim 1, wherein the master audio device comprises a master SOUNDWIRE-I3S audio device.

3. The IC of claim 1, wherein the master audio device further comprises a register configured to hold a slave capability regarding the communication rate.

4. The IC of claim 1, wherein the control circuit is configured to signal the communication rate during a check PHY_Num state.

5. The IC of claim 1, wherein the master audio device comprises one of an application processor, a digital signal processor (DSP), or a codec.

6. The IC of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

7. An integrated circuit (IC) comprising:
a slave audio device comprising:
an audio bus interface coupled to a differential audio bus; and
a control circuit configured to:
during activation of the differential audio bus from a standby state where a data positive (DP) line and a data negative (DN) line of the differential audio bus are both at logical lows, receive a signal indicating a communication rate on the DN line of the differential audio bus while the DP line of the differential audio bus is held at a logical high; and
start communication with a master audio device at the communication rate without passing through a safe mode.

8. The IC of claim 7, wherein the slave audio device comprises a slave SOUNDWIRE-I3S audio device.

9. The IC of claim 7, wherein the slave audio device further comprises a register configured to hold a capability regarding the communication rate.

10. The IC of claim 7, wherein the control circuit is configured to receive the communication rate during a check PHY_Num state.

11. The IC of claim 7, wherein the slave audio device comprises one of a digital signal processor (DSP), a microphone, a speaker, or a codec.

12. The IC of claim 7, wherein the control circuit is configured to default to the safe mode in absence of the signal.

13. A method for controlling a differential audio bus, the method comprising:
exiting a standby state where a data positive (DP) line and a data negative (DN) line of the differential audio bus are both at logical lows by sending a logical high on the DP line;
sending an encoded signal on the DN line of the differential audio bus from a master audio device to a slave audio device indicating a communication rate while holding the DP line of the differential audio bus at the logical high; and
starting communication at the communication rate without passing through a safe mode.

14. The method of claim 13, wherein the master audio device comprises a master SOUNDWIRE-I3S audio device.

15. The method of claim 13, further comprising storing a slave capability in a register in the master audio device.

16. The method of claim 13, wherein sending the encoded signal comprises sending the encoded signal during a check PHY_Num state.

17. A method of operating a differential audio bus, the method comprising:
during activation of the differential audio bus from a standby state where a data positive (DP) line and a data negative (DN) line of the differential audio bus are both at logical lows, receiving, at a slave audio device, a signal indicating a communication rate on the DN line of the differential audio bus while the DP line of the differential audio bus is held at a logical high; and
starting communication with a master audio device at the communication rate without passing through a safe mode.

18. The method of claim 17, wherein the slave audio device comprises a slave SOUNDWIRE-I3S audio device.

19. The method of claim 17, further comprising providing a capability regarding the communication rate from a register in the slave audio device to the master audio device.

20. The method of claim 17, further comprising receiving the signal indicating the communication rate during a check PHY_Num state.

\* \* \* \* \*